United States Patent [19]

Eggert, Jr.

[11] 4,149,221

[45] Apr. 10, 1979

[54] COMBINED BAGGAGE RACK AND LIGHT ASSEMBLY

[75] Inventor: Walter S. Eggert, Jr., Huntington Valley, Pa.

[73] Assignee: The Budd Company, Troy, Mich.

[21] Appl. No.: 869,758

[22] Filed: Jan. 16, 1978

[51] Int. Cl.$^2$ ............................................. F21S 1/02
[52] U.S. Cl. ..................................... 362/73; 224/29.5
[58] Field of Search ................. 362/73, 418, 430, 404; 224/29.5; 211/90; 248/235

[56] References Cited

U.S. PATENT DOCUMENTS

| | | | |
|---|---|---|---|
| 2,251,050 | 7/1941 | Hagerty et al. | 362/73 |
| 2,284,356 | 5/1942 | Arenberg | 362/73 |
| 2,536,799 | 1/1951 | Divizia | 362/73 |
| 2,622,189 | 12/1952 | Rahn | 362/73 |
| 2,843,729 | 7/1958 | Materese | 362/73 |
| 2,915,619 | 12/1959 | Materese | 362/73 |

Primary Examiner—Samuel W. Engle
Assistant Examiner—Ralph Palo

[57] ABSTRACT

A combined baggage rack and overhead light assembly for attachment to an interior wall of a vehicle includes a pair of parallel support arm assemblies extending outwardly away from the wall for receiving a grill which provides the baggage rack. An elongated overhead light fixture housing is connected below the baggage rack and includes a pair of elongated tracks having an elongated opening therebetween to receive a plurality of light fixtures. The light fixtures are adapted to be moved on the tracks to different desired positions, dependent upon the seating arrangement in the vehicle, prior to securing them in place on said tracks. Panels of predetermined lengths are placed between adjacent pairs of light fixtures after fixtures are secured in place.

9 Claims, 7 Drawing Figures

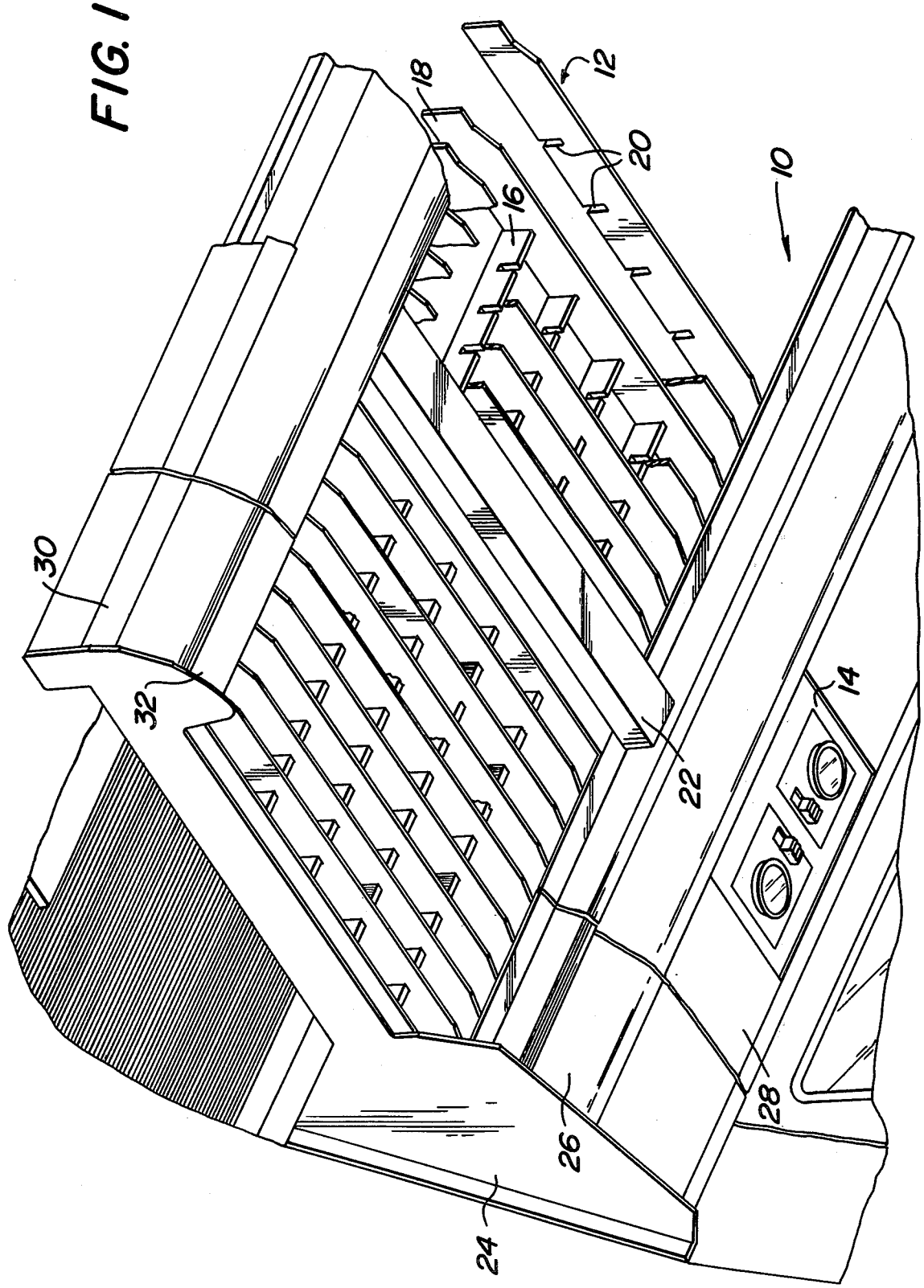

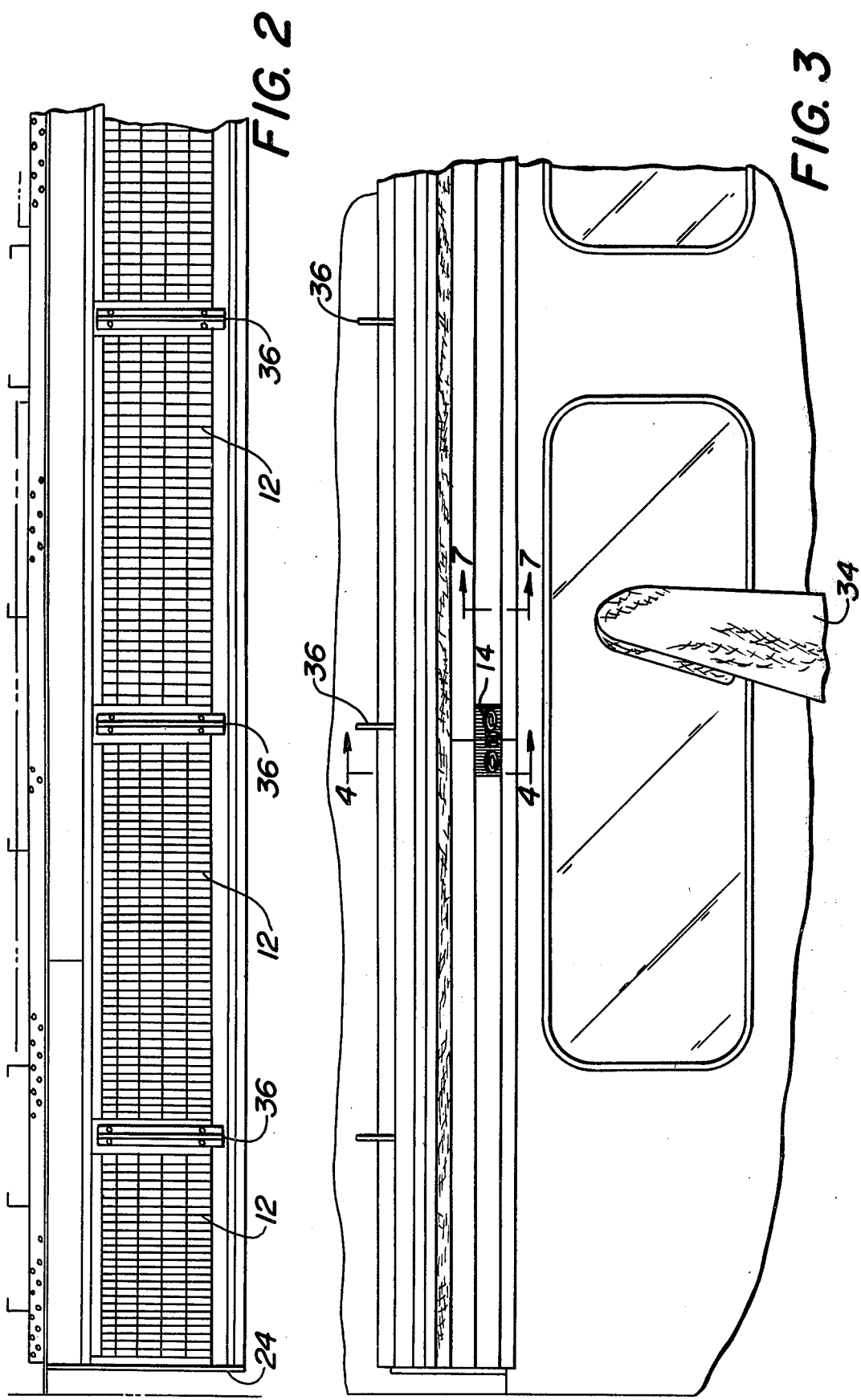

COMBINED BAGGAGE RACK AND LIGHT ASSEMBLY

Baggage racks and light fixtures have taken a wide variety of different forms, as exemplified in patents to Dean U.S. Pat. No. 2,882,836 and Mealing U.S. Pat. No. 3,348,699. In most cases the baggage rack and light fixture designs have been independent of each other, often leading to duplication of parts and a lack of overall aesthetic appearance in the interior design of the car.

Sometimes it is desirable to use the same standard interior of a car and use baggage racks of different lengths where separate compartments in the car is desired, for example. Also, often it is desirable to use the same standard interior in a car with different seating arrangements or with different spacings between the seats for different commutor areas. Differing seating arrangements generally require that the light fixture be placed at different locations to provide proper overhead lighting.

It is an object of this invention to provide an assembly which may include both a baggage rack and lighting arrangement.

It is a further object of this invention to provide an improved baggage rack and light assembly for a vehicle in which individual light fixtures may be moved to different positions to accommodate different seating arrangements in the vehicle.

It is still a further object of this invention to provide an improved baggage rack and light assembly in which the baggage rack may be easily made to different lengths, is light in weight and permits maximum air circulation to take place between the top and bottom of the rack.

In accordance with the present invention, a combined baggage rack and overhead light assembly for attachment to an interior wall of a vehicle includes a mounting secured to the wall. At least two parallel support assemblies are attached to the mounting and extend outwardly away from the wall. An open grill member for holding baggage thereon is disposed to fit between and rest on the two support assemblies. An elongated light fixture housing extends along the wall below the grill. The light fixture housing includes a pair of elongated parallel tracks forming an elongated opening therebetween to receive light fixtures therein. The light fixtures may be moved on the tracks to different desired positions prior to securing them in place. Panels of predetermined lengths are then installed on the frame between adjacent pairs of light fixtures to fill in the openings between the light fixtures.

Other objects and advantages of the present invention will be apparent and suggest themselves to those skilled in the art, from a reading of the following specification and claims, taken in conjunction with the accompanying drawing, in which:

FIG. 1 is a perspective view taken at an upward angle illustrating the bottom of the baggage rack and overhead light assembly, in accordance with the present invention;

FIG. 2 is a top view of the baggage rack, in accordance with the present invention;

FIG. 3 is a side view of part of the interior of a car with the combined baggage rack and light assembly, in accordance with the present invention;

Figure 4:
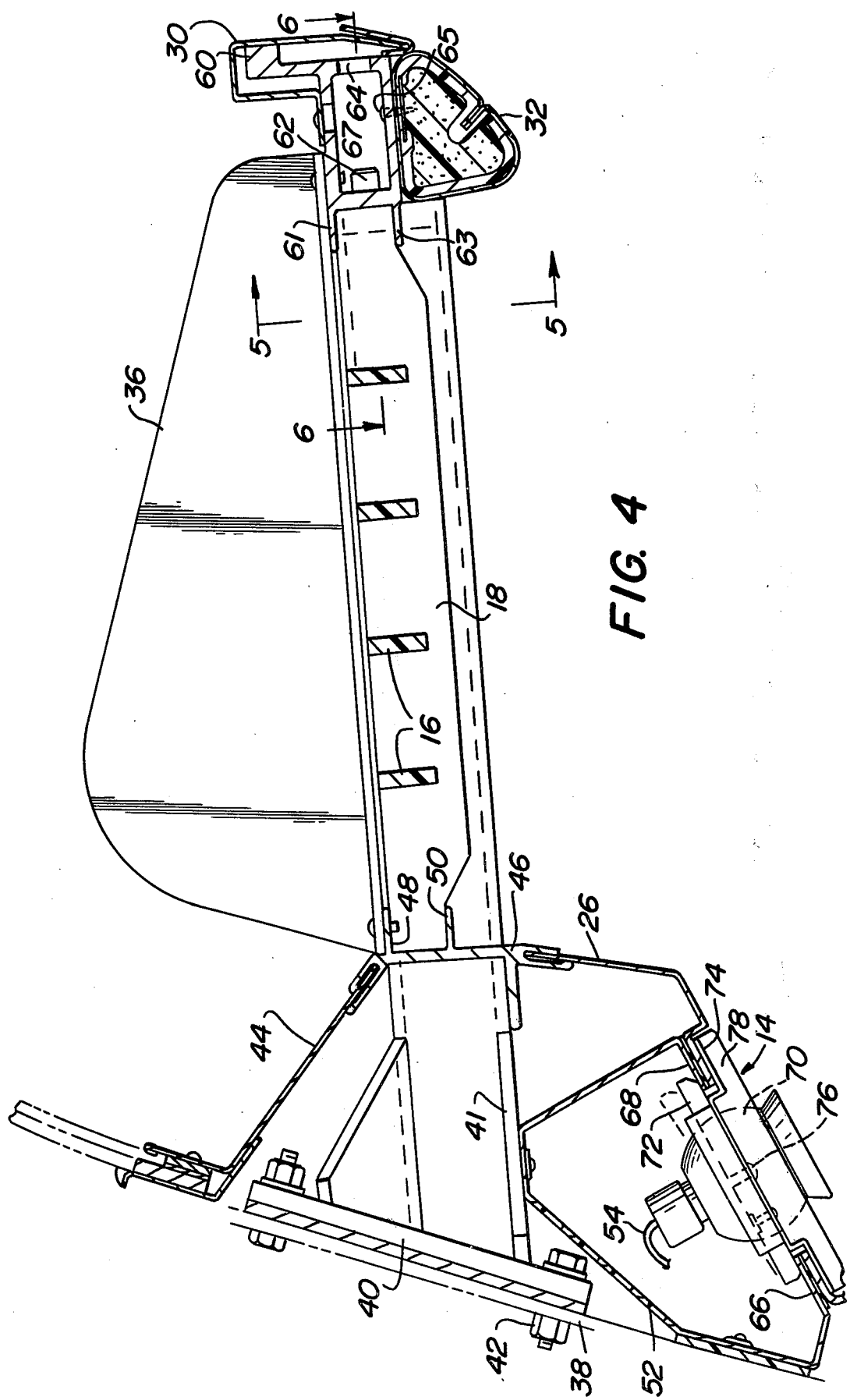
FIG. 4 is a cross-sectional view taken along lines 4—4 of FIG. 3.

Referring particularly to FIGS. 1, 2 and 3, a combined baggage and overhead light assembly arrangement 10 includes baggage rack 12 and a plurality of light fixture assemblies 14.

The baggage rack 12 comprises a plurality of longitudinal grating bars 16 connected to a plurality of transverse grating bars 18. The longitudinal and transverse grating bars are adapted to be connected to each other by fitting one set of bars 16 into slit openings 20 of the other set of bars 18 to provide an integral grill type baggage rack 12.

The rack 18 is adapted to slide in between pairs of protruding spaced tracks on panel covered support members 22 between and on two side edges by the support members 22. Each of the support members support one side of two adjacent racks connected in a line. End cut-off assemblies, such as the assembly 24, may be provided at both ends of the baggage rack assembly for supporting one side of a single rack, i.e., the first or last in the line of racks. The support members 22 and end cut-off assemblies 24 are connected to the wall 38 (FIG. 4) of the car. The baggage rack 12 is connected externally to an inner housing for the light fixture assemblies 14 by means of a trim plate 26. The entire external design is directed towards providing a uniform overall appearance between the baggage rack and the light fixture assemblies 14. As will be described in detail, the light fixture assemblies 14 are adapted to be moved longitudinally within a housing to different overhead positions in a car, depending upon the particular seating arrangement involved. After the fixture assemblies 14 are installed in the positions desired, panels 28 of predetermined lengths are then inserted in the housing between adjacent light fixture assemblies 14 to fill in the spaces therebetween.

As illustrated, the baggage rack 12, which actually comprises a plurality of individual pieces, extends inwardly away from the inner wall 38 of the car and is supported on its two side edges by the support members 22. Extending side protrusions from the support members guide the rack 12 into position and holds it in place after installation.

The front end portion covering the front edge of the rack 12 includes a nose and ticket holder assembly 30 and a head bumper 32 which may comprise a fabric covered foam-filled member.

The spacings between the support members 22 may be varied to accommodate different lengths of racks without changing the basic design of the car. Likewise, the light fixture assemblies 14 may be readily changed to different positions for different seating arrangements or spacings of the seats 34.

The grill type arrangement of the rack 12 illustrated permit free ventilation through the rack while still providing a strong support for holding baggage and the like. The entire structure illustrated is especially designed to provide adequate strength so as to withstand the weight of passengers who may tend to hold on to and exert downward pressure on the front edge portions of the baggage rack.

Vertical separator plates 36 are secured to the support members 22. It is noted that the support members 22 may be placed in different positions so that each area between the separator plates 36 above a seat may accommodate one or more passengers in the immediate vicinity. The type of grill employed for the baggage rack is especially adapted to be made shorter or longer as desired without redesign of the parts involved.

Figure 5:
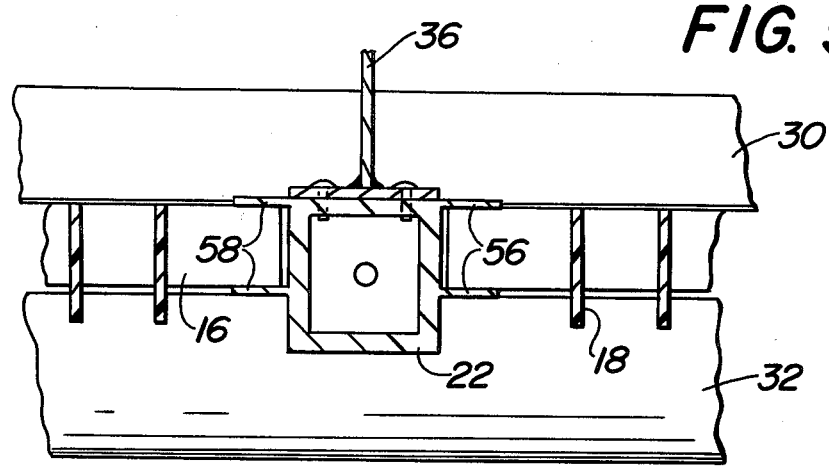
FIG. 5 is a cross-sectional view taken along lines 5—5 of FIG. 4.
Figure 6:
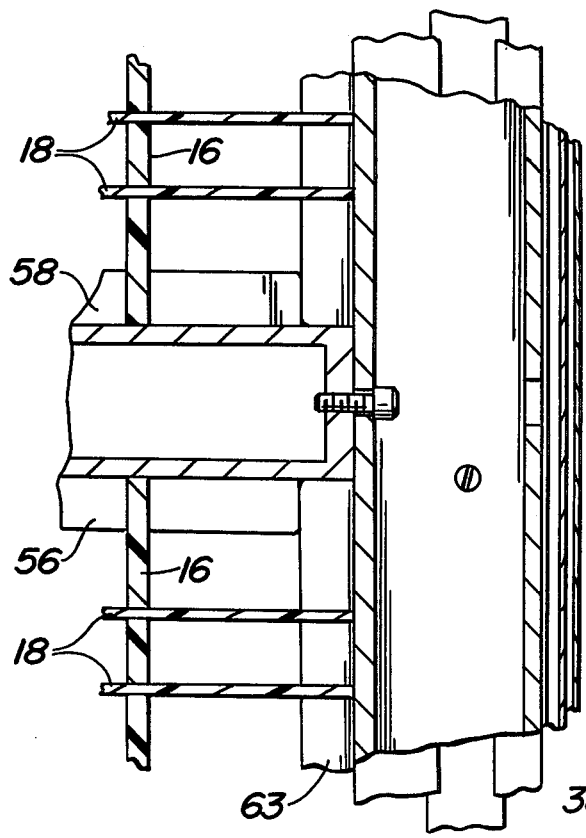
FIG. 6 is a cross-sectional view taken along lines 6—6 of FIG. 4.
Figure 7:
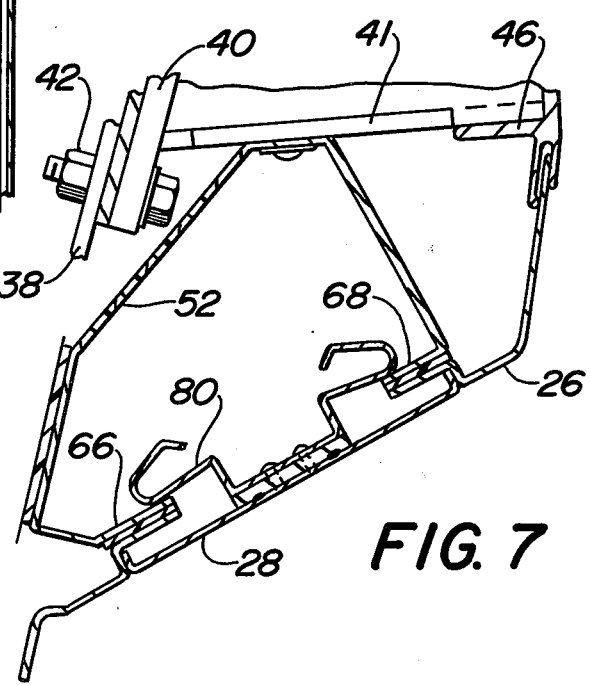
FIG. 7 is a cross-sectional view taken along lines 7—7 of FIG. 3.

Referring to FIG. 4, as well as the remaining FIGS. 5, 6 and 7, support assembly 22 is mounted to the wall 38 of the car by means of a mounting plate 40 secured to the wall 38 by means of bolts 42. Support members 41 are connected to the plate 40 to support the various members associated with the baggage rack. A trim plate 44 is provided to close off the top assembly including the main wall supports.

An elongated rear member 46, which may be an extruded aluminum piece, includes a pair of forwardly extending portions 48 and 50 having a space therebetween for receiving and holding in place the rear edge portions of the rack 12, which include the ends of the transverse grating bars 18.

As illustrated in FIGS. 5 and 6, along with FIG. 4, the support members 22 each include two pairs of protruding sections 56 and 58 disposed on opposite edges. The space between the protruding sections may be considered as a guide to permit side edges of the rack 12, i.e., the ends of the longitudinal grating bars 16, to ride therebetween to be guided into position and finally supported on the bottom protruding sections of the adjacent support members. It is thus seen that prior to the installation of the front portion of the baggage rack that the rack 12 is supported toward its rear between the extruding portions 48 and 50 and on the two sides by the protruding sections 56 and 58.

After the baggage rack is in place, elongated front strip 60, which may be of extruded aluminum, is secured to the ends of the support members 22 by means of screws 62 through openings 64. The strip 60 includes projecting edges 61 and 63 to receive and support the front edge of the rack, i.e., the end of the bars 18.

The head bumper 32 is secured to the piece 60 by means of a screw 65, with access thereto being through an aperture 67.

The trim plate 26 extends from a slit opening in the extruded rear member 46 to a light housing 52 which contains the light assemblies 14 and panel covers 28. The light housing assembly 52 is secured to the wall 38 by suitable means and is also attached to the bottom portion of the wall bracket 41. The light housing 52 extends the length of the baggage rack including the entire series of individual racks 12.

The light housing 52 includes an extended central opening having a pair of tracks 66 and 68 disposed on opposite sides of the opening. The light assemblies 14 are adapted to fit into the opening of the housing 52 and moved on the pair of tracks 66 and 68 to selected positions. Wires 54 connected to the light assemblies 14 are made slightly longer than desired to accommodate the different positions of the light assemblies. For example, each of the light assemblies 14 may be movable approximately six inches to the right or left from a central point without the necessity of disconnecting or changing the wiring to the source of power.

As illustrated in FIG. 4, the light assembly fixture 14 is of a conventional type commercially available, is adapted to ride inside the central opening of the housing 52 on the pair of tracks 66 and 68. The light assembly fixture 14 includes the main light bulb holding element 70 and includes a back plate 72 with a front clip 74. A screw 76 may be loosened to permit the plate 72 to be positioned, as indicated by the dotted lines, and inserted into the central opening of the light housing. After insertion, the screw 76 is tightened to force the back plate 72 towards the front spring-like member 74 to tighten the light fixture in place. At this point, an escutcheon 78 is snapped in place by means of conventional snap-in fasteners.

Referring particularly to FIG. 7, panel 28 includes a spring element 80 connected thereto which is adapted to be forced into and spring into place the tracks 66 and 68. It is seen that the light fixture 14 may be inserted at any position prior to the installation of the panel 28. Panel 28 may be designed for particular sizes depending upon the seating arrangement.

What is claimed is:

1. In a vehicle having an interior wall and a combined baggage rack and overhead lighting assembly secured to said interior wall, comprising:
   a. mounting means secured to said wall,
   b. means including at least two spaced support members attached to said mounting means and extending inwardly away from said wall,
   c. a grill member having a plurality of longitudinal and transverse bars, said bars having cooperating notch openings therein to permit said bars to be nested together for forming said grill member for holding baggage disposed between said support members, ends of said longitudinal bars forming opposed end edges and ends of said transverse bars forming opposed side edges of said grill member, said end edges of said grill member being supported by said support members,
   d. an elongated light fixture housing and means for attaching said elongated light fixture housing to said wall extending longitudinally below said grill member,
   e. said light fixture housing being connected to said support members and including a pair of elongated tracks having a centrally disposed opening therebetween,
   f. a plurality of light fixture assemblies and means for movably mounting said plurality of light fixture assemblies in said centrally disposed opening to permit said light fixture assemblies to be moved on said pair of tracks to different predetermined positions prior to securing them in place on said tracks,
   g. means for securing said light fixture assemblies to said tracks at the predetermined positions, and
   h. means for mounting panels of predetermined lengths on said light fixture housing between adjacent pairs of said light fixture assemblies to fill in any openings therebetween.

2. A combined baggage rack and overhead lighting assembly as set forth in claim 1 wherein a rear elongated strip is provided having two protruding portions extending therefrom to receive and support a side edge of said grill member in the space between said two protruding portions.

3. A combined baggage rack and overhead lighting assembly as set forth in claim 2 wherein an elongated front strip is provided having two protruding portions extending therefrom to receive and support the other side edge of said grill member.

4. A combined baggage rack and overhead lighting assembly as set forth in claim 3 in which separation plates are secured to and extend upwardly from said support members.

5. A combined baggage rack and overhead lighting assembly as set forth in claim 4 wherein each of said plurality of light fixture assemblies include a back plate and front member disposed on opposite sides of said pair of tracks connected by an adjustment element which may be set to permit each said light assembly to be moved freely on said tract or set to hold said back plate and front member firmly secured to said tracks.

6. A combined baggage rack and overhead lighting assembly as set forth in claim 5 wherein each of said mounting panels includes a rear bias spring element mounted thereto to permit each of said mounting panels to be snapped and held in place on said pair of tracks.

7. A combined baggage rack and overhead lighting assembly as set forth in claim 6 wherein said elongated front strip includes an elongated ticket holder member attached thereto.

8. A combined baggage rack and overhead assembly as set forth in claim 7 wherein said elongated front strip includes an elongated head bumper member.

9. A combined baggage rack and overhead lighting assembly as set forth in claim 8 wherein the wires connecting said light fixture assemblies are of such lengths to permit limited movements of said assemblies without disconnecting said wires from the source of power.

* * * * *